United States Patent
Im et al.

(10) Patent No.: US 12,225,182 B2
(45) Date of Patent: Feb. 11, 2025

(54) DISPLAY DEVICE AND CONTROL METHOD THEREOF

(71) Applicant: SAMSUNG ELECTRONICS CO., LTD., Suwon-si (KR)

(72) Inventors: Sangkyun Im, Suwon-si (KR); Jaehoo Park, Suwon-si (KR); Joowhan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/387,706

(22) Filed: Nov. 7, 2023

(65) Prior Publication Data

US 2024/0073403 A1    Feb. 29, 2024

Related U.S. Application Data

(63) Continuation of application No. PCT/KR2022/008443, filed on Jun. 15, 2022.

(30) Foreign Application Priority Data

Jul. 5, 2021    (KR) .................. 10-2021-0087619

(51) Int. Cl.
*G09G 3/00* (2006.01)
*G09G 3/32* (2016.01)
*H04N 13/393* (2018.01)

(52) U.S. Cl.
CPC ........... *H04N 13/393* (2018.05); *G09G 3/005* (2013.01); *G09G 3/035* (2020.08); *G09G 3/32* (2013.01);
(Continued)

(58) Field of Classification Search
CPC .......... G09G 3/005; G09G 3/035; G09G 3/32; G09G 2340/0442; G09G 2370/16; H04N 13/393

See application file for complete search history.

(56) References Cited

U.S. PATENT DOCUMENTS 5,082,422 A    1/1992    Wang
6,037,876 A    3/2000    Crouch
(Continued)

FOREIGN PATENT DOCUMENTS

CN    109493774 A    3/2019
JP    2004-229063 A    8/2004
(Continued)

OTHER PUBLICATIONS

International Search Report (PCT/ISA/210) issued by the International Searching Authority on Sep. 29, 2022 in International Application No. PCT/KR2022/008443.
(Continued)

*Primary Examiner* — Gene W Lee
(74) *Attorney, Agent, or Firm* — Sughrue Mion, PLLC

(57) ABSTRACT

A display device includes a main body; a first rotatable shaft included in a first portion of the main body; a second rotatable shaft included in a second portion of the main body, the second portion being opposite to the first portion; a motor disposed inside the main body, and connected to at least one of the first rotatable shaft and the second rotatable shaft; a transparent wire including a first end connected to the first rotatable shaft and a second end connected to the second rotatable shaft; a plurality of light emitting diodes (LEDs) included inside the transparent wire in a longitudinal direction of the transparent wire; a driving circuit configured to drive the plurality of LEDs; and a processor configured to control the motor to rotate the transparent wire, and to provide an image frame to the driving circuit to display an image by rotation of the transparent wire.

15 Claims, 9 Drawing Sheets

(52) U.S. Cl.
CPC . *G09G 2340/0442* (2013.01); *G09G 2370/16* (2013.01)

(56) References Cited

U.S. PATENT DOCUMENTS

| | | | |
|---|---|---|---|
| 7,165,841 | B2 | 1/2007 | Satoh et al. |
| 8,625,183 | B2 | 1/2014 | Khan |
| 10,474,100 | B2 | 11/2019 | Chung et al. |
| 10,908,424 | B2 | 2/2021 | Lee et al. |
| 11,361,689 | B2 | 6/2022 | Onuki |
| 11,627,304 | B2 | 4/2023 | Kim |
| 11,738,282 | B2 | 8/2023 | Yang et al. |
| 2002/0005826 | A1 | 1/2002 | Pederson |
| 2002/0126119 | A1 | 9/2002 | Tashman |
| 2005/0231499 | A1 | 10/2005 | Wang et al. |
| 2006/0198143 | A1* | 9/2006 | Cheung .............. H05B 45/10 362/249.06 |
| 2007/0103545 | A1 | 5/2007 | Listig et al. |
| 2007/0107771 | A1* | 5/2007 | Tempesta ............ H01M 10/615 429/96 |
| 2017/0059140 | A1* | 3/2017 | Dubuc ................. F21S 4/22 |
| 2022/0326522 | A1 | 10/2022 | Shin et al. |
| 2022/0377916 | A1 | 11/2022 | Park |
| 2022/0418116 | A1* | 12/2022 | Im ..................... H01L 25/162 |
| 2023/0018982 | A1 | 1/2023 | Rohena et al. |

FOREIGN PATENT DOCUMENTS

| | | |
|---|---|---|
| JP | 4628179 B2 | 2/2011 |
| JP | 6676831 B2 | 4/2020 |
| JP | 7007286 B2 | 1/2022 |
| JP | 2022-536992 A | 8/2022 |
| KR | 10-2000-0059093 A | 10/2000 |
| KR | 10-0961772 B1 | 6/2010 |
| KR | 10-1070468 B1 | 10/2011 |
| KR | 10-1741097 | 5/2017 |
| KR | 10-1850511 B1 | 4/2018 |
| KR | 10-1943168 B1 | 2/2019 |
| KR | 10-1938753 B1 | 4/2019 |
| KR | 10-2019-0123511 A | 11/2019 |
| KR | 10-2020-0015189 A | 2/2020 |
| KR | 10-2020-0037778 A | 4/2020 |
| KR | 10-2102746 B1 | 4/2020 |
| KR | 10-2021-0010370 A | 1/2021 |
| KR | 10-2200795 B1 | 1/2021 |
| KR | 10-2021-0051492 A | 5/2021 |
| WO | 2019/078908 A1 | 4/2019 |

OTHER PUBLICATIONS

Communication issued on Aug. 28, 2024 by the European Patent Office in European Patent Application No. 22837843.6.
Communication issued on Oct. 29, 2024 by the European Patent Office in European Patent Application No. 22837843.6.

* cited by examiner

DISPLAY DEVICE AND CONTROL METHOD THEREOF

CROSS-REFERENCE TO RELATED APPLICATION

This application is a bypass continuation of International Application No. PCT/KR2022/008443, filed on Jun. 15, 2022, in the Korean Intellectual Property Receiving Office, which claims priority to Korean Patent Application No. 10-2021-0087619, filed on Jul. 5, 2021, in the Korean Intellectual Property Office, the disclosures of which are incorporated by reference herein in their entireties.

BACKGROUND

1. Field

The disclosure relates to a display device and a control method thereof, and more specifically, to a display device capable of displaying an image by rotating a wire including a light-emitting diode, and a control method thereof.

2. Description of Related Art

In general, a display device may be an output device that converts obtained or stored electrical information into visual information and displays the visual information to a user, and may be used in various fields such as a home or a workplace.

For example, display devices may be monitor devices connected to computers, portable computer systems, Global Positioning System (GPS) terminals, general television sets, Internet Protocol televisions (IPTVs), portable terminals such as smartphones, tablet Personal Computers (PCs), and Personal Digital Assistants (PDAs). Such display devices may be used to reproduce images like advertisements or films, and have a wide range of applications.

The display devices include a light source device to convert an electrical signal to a visual signal, and the light source device includes a plurality of point light sources that independently emit light. The light source may include, for example, a Light Emitting Diodes (LEDs) or an Organic LEDs (OLEDs).

In some display devices, an image may be displayed on a planar (for example, rectangular) screen, and users could view the image output through the display device in a specific direction (e.g., the front of the display device) to which the screen is directed. The images that are output on the display device having a rectangular shape may be limited to a rectangle.

Recently, other types of display devices capable of providing users with a variety of visual experiences, in addition to the standardized display devices, have been developed.

SUMMARY

Provided is a display device capable of displaying an image by rotating a transparent wire including light emitting diodes, and a control method thereof.

Additional aspects will be set forth in part in the description which follows and, in part, will be apparent from the description, or may be learned by practice of the presented embodiments.

In accordance with an aspect of the disclosure, a display device includes a main body; a first rotatable shaft included in a first portion of the main body; a second rotatable shaft included in a second portion of the main body, the second portion being opposite to the first portion; a motor disposed inside the main body, and connected to at least one of the first rotatable shaft and the second rotatable shaft; a transparent wire including a first end connected to the first rotatable shaft and a second end connected to the second rotatable shaft; a plurality of light emitting diodes (LEDs) included inside the transparent wire in a longitudinal direction of the transparent wire; a driving circuit configured to drive the plurality of LEDs; and a processor configured to control the motor to rotate the transparent wire, and to provide an image frame to the driving circuit to display an image by rotation of the transparent wire.

The display device may further include a substrate included in the transparent wire in the longitudinal direction of the transparent wire, wherein the plurality of LEDs are mounted on at least one of an upper surface of the substrate and a lower surface of the substrate.

The display device may further include a plurality of lenses mounted on the substrate to cover each of a plurality of pixels formed by the plurality of LEDs, wherein the plurality of lenses are configured to diffuse light emitted from the plurality of LEDs.

The display device may further include a shaft actuator disposed in the main body, wherein the shaft actuator is configured to move at least one of the first rotatable shaft and the second rotatable shaft in a direction parallel to a rotation axis.

The processor may be further configured to: set a display area in which the image is displayed based on a size of the image frame; adjust a movement distance of the at least one of the first rotatable shaft and the second rotatable shaft based on the display area to produce an adjusted movement distance; and control the shaft actuator based on the adjusted movement distance.

The processor may be configured to adjust a rotational speed of the motor based on the adjusted movement distance of the at least one of the first rotatable shaft and the second rotatable shaft.

The processor may be configured to set the display area corresponding to a ratio of a width of the image frame and a height of the image frame.

The processor may be further configured to, based on a size of the image frame being greater than a maximum size of a configurable display area, scale the image frame.

The processor may be further configured to: obtain the image frame by decoding image data, divide the image frame into a plurality of image frame parts, and sequentially provide the plurality of image frame parts to the driving circuit at each predetermined rotation angle of the transparent wire.

The processor may be further configured to adjust a rotational speed of the motor based on adjustment of a frame rate.

The display device may further include a wireless communication module configured to establish a wireless communication channel with the driving circuit, wherein the processor is further configured to transmit the image frame using the wireless communication module through the wireless communication channel.

In accordance with an aspect of the disclosure, a control method of a display device includes providing an image frame to a driving circuit configured to drive a plurality of light emitting diodes (LEDs); rotating at least one of a first rotatable shaft and a second rotatable shaft connected to a transparent wire including the plurality of LEDs to move the transparent wire in a circular motion; and displaying an image by driving the plurality of LEDs simultaneously with the circular motion of the transparent wire.

The providing of the image frame may include dividing the image frame into a plurality of image frame parts; and sequentially providing the plurality of image frame parts to the driving circuit at a plurality of predetermined rotation angles of the transparent wire.

The providing of the image frame may include setting a display area for displaying the image based on a size of the image frame.

The rotating of the at least one of the first rotatable shaft and the second rotatable shaft may include moving the at least one of the first rotatable shaft and the second rotatable shaft in a direction parallel to a rotation axis based on the display area.

The disclosed display device and the control method thereof may display an image by performing a circular motion on a transparent wire including light emitting diodes. The disclosed display device and the control method thereof may provide a user with a new visual experience by outputting a new type of image with a new form factor different from existing display devices.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
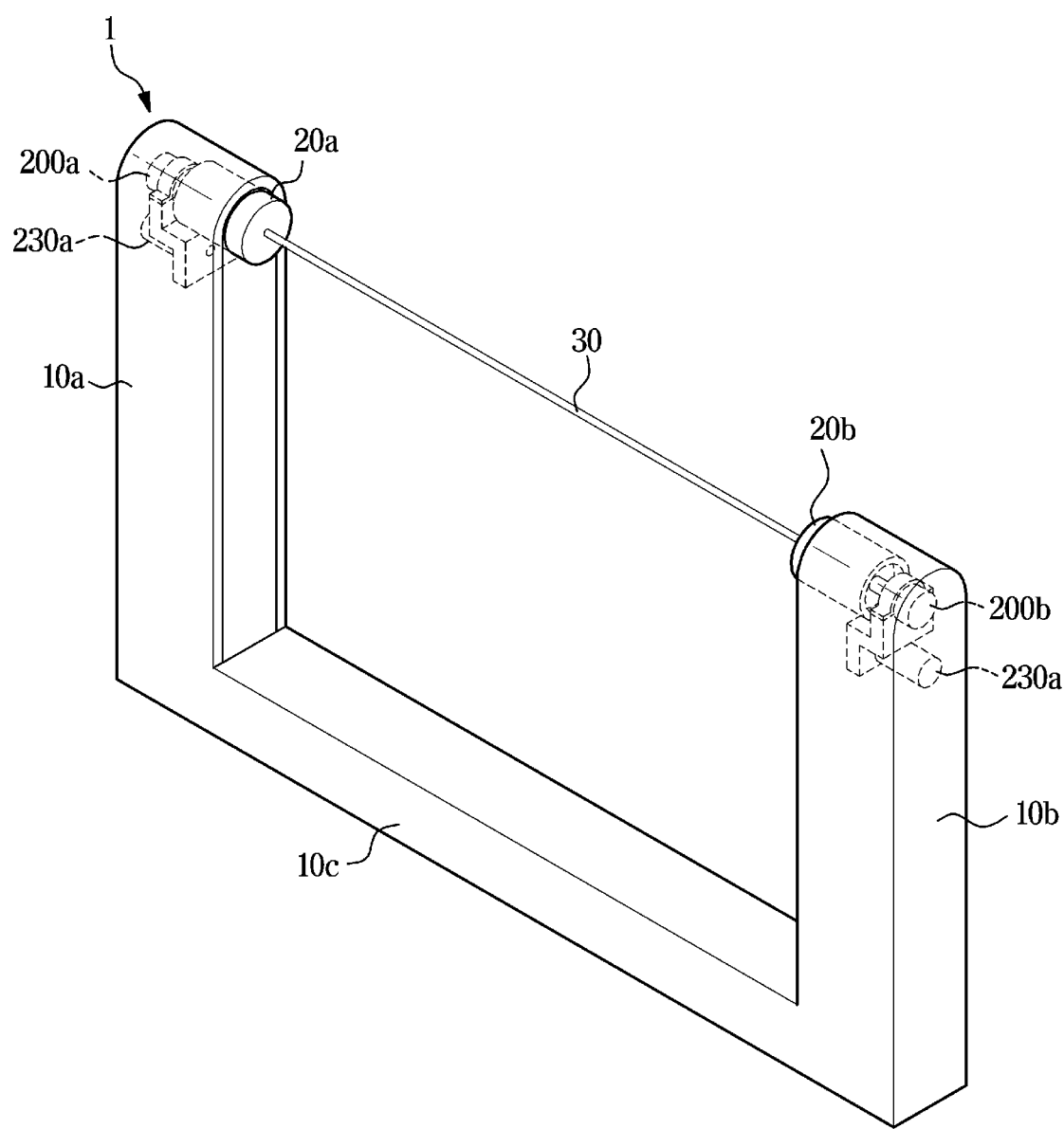
FIG. 1 illustrates a display device according to an embodiment.

Like reference numerals throughout the specification denote like elements. Also, this specification does not describe all the elements according to embodiments of the disclosure, and descriptions well-known in the art to which the disclosure pertains or overlapped portions may be omitted. Terms such as "part", "member", "module", ~block", and the like may refer to at least one process processed by at least one hardware or software. According to embodiments, a plurality of "part", "member", "module", "block" may be embodied as a single element, or a single of "part", "member", "module", "block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated elements, but do not preclude the presence or addition of one or more other elements.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, embodiments of the disclosure are described in detail with reference to the accompanying drawings.

Figure 2:
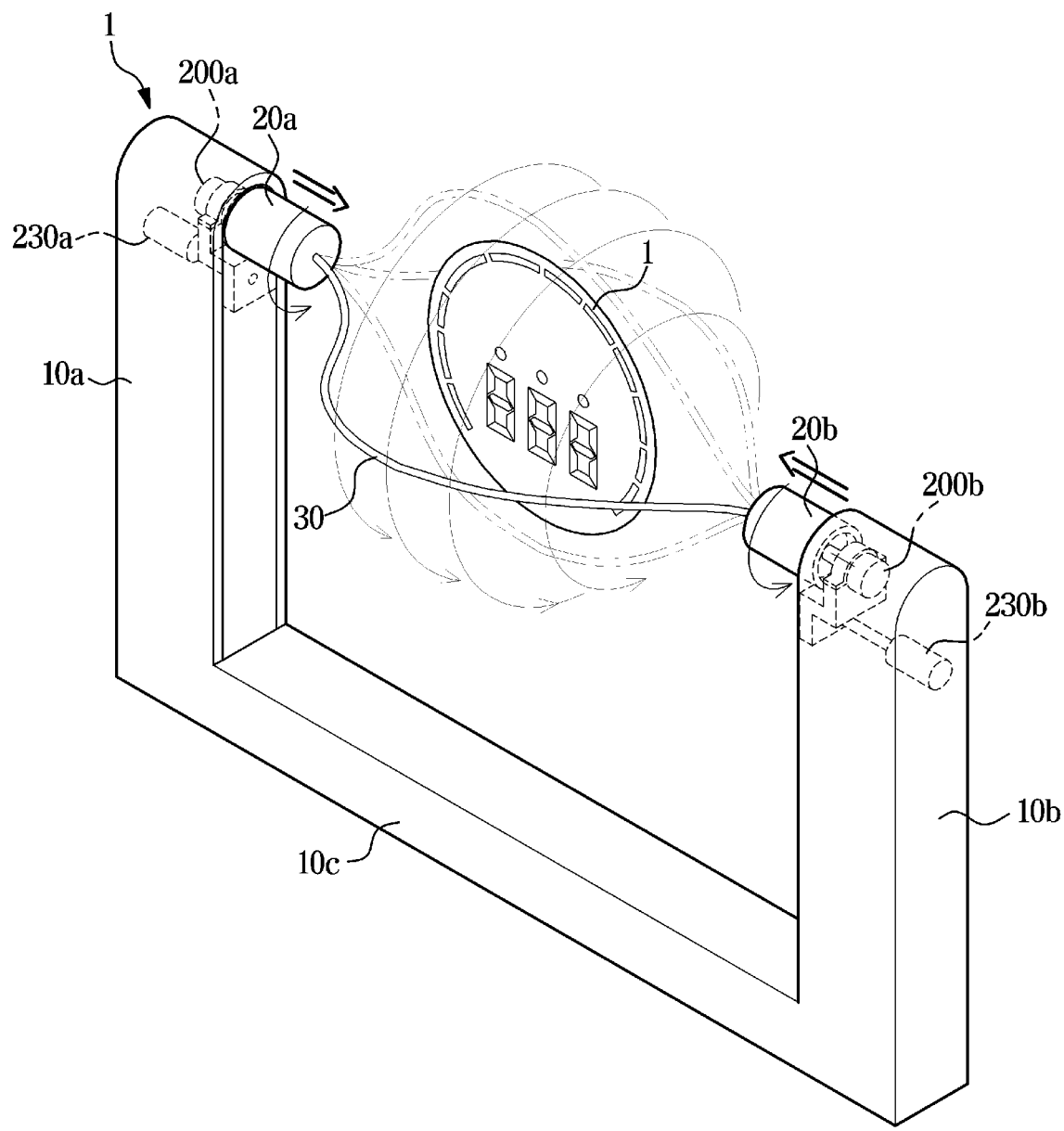
FIG. 2 illustrates a state in which the display device is in operation according to an embodiment.

FIG. 1 illustrates a display device according to an embodiment. FIG. 2 illustrates a state in which the display device according to an embodiment is in operation.

A display device 1 may process an image signal received from the outside and visually display a processed image. The display device 1 may be used for personal use at home, as well as for commercial use in businesses, and the like. The display device 1 may visually display commercial advertisements. The display device 1 may be installed in various locations. For example, the display device 1 may be installed in a place where a large number of people may come and go, such as a building rooftop, a bus stop, a subway station, a shopping mall, a movie theater, an office or a store.

The display device 1 may receive content data including an image signal, a video signal and/or an audio signal from various content sources. The display device 1 may also output an image, video and/or audio corresponding to the image signal, the video signal and/or the audio signal, respectively. For example, the display device 1 may receive content data through a broadcast receiving antenna or a wired cable, receive content data from a content playback device, or receive content data from a content-providing server of a content provider.

Referring to FIG. 1 and FIG. 2, the display device 1 may include a main body 10, a shaft 20, a transparent wire 30, a rotating assembly 200 and a shaft actuator 230.

The main body 10 may have various shapes. For example, the main body 10 may include a left frame 10a, a right frame 10b and a lower frame 10c. The left frame 10a and the right frame 10b may extend vertically from the lower frame 10c. That is, the main body 10 may have a rectangular ring shape with partially open portion or a C-ring shape. As another example, the main body 10 may further include an upper frame and may have a rectangular shape. In addition to the above, the main body 10 may have various shapes.

A shaft 20 may be provided in one portion of the main body 10. For example, a first rotatable shaft 20a may be provided at a first portion of the main body 10, and a second rotatable shaft 20b may be provided at a second portion of the main body 10. The second portion is opposite to the first portion. In other words, the first rotatable shaft 20a may be provided at the first portion of the left frame 10a, and the second rotatable shaft 20b may be provided at the second portion of the right frame 10b. A rotation axis of the first rotatable shaft 20a and the second rotatable shaft 20b may be positioned on a straight line. The first rotatable shaft 20a and the second rotatable shaft 20b may be disposed to face each other. Both the first rotatable shaft 20a and the second rotatable shaft 20b may be rotatable, or only one of the first rotatable shaft 20a and the second rotatable shaft 20b may be rotatable.

The rotating assembly 200 may be provided inside the main body 10. At least one rotating assembly 200 may be provided. For example, a first rotating assembly 200a may rotate the first rotatable shaft 20a and a second rotating assembly 200b may rotate the second rotatable shaft 20b. A single rotating assembly 200 capable of rotating both the first rotatable shaft 20a and the second rotatable shaft 20b may be provided. The rotating assembly 200 may include a support and/or a rotating plate connected to the shaft 20 and rotating together with the shaft 20.

In addition, the rotating assembly 200 may include a motor 210 and a motor driver 220. The shaft 20 may rotate by rotation of the motor 210. One or more motors 210 may be provided. For example, a first motor for rotating the first rotatable shaft 20a and a second motor for rotating the second rotatable shaft 20b may be provided. At least one of the first rotatable shaft 20a and the second rotatable shaft 20b may be rotated by an operation of the motor 210, and the transparent wire 30 connected to the shaft 20 may rotate.

The transparent wire 30 may be provided between the first rotatable shaft 20a and the second rotatable shaft 20b. One end of the transparent wire 30 may be connected to the first rotatable shaft 20a, and another end of the transparent wire 30 may be connected to the second rotatable shaft 20b. The transparent wire 30 may perform a circular motion by rotation of at least one of the first rotatable shaft 20a and the second rotatable shaft 20b. That is, a central portion of the transparent wire 30 may move along a circular path about the rotation axis of the shaft 20. In other words, the transparent wire 30 may move in a circular motion about the rotation axis of the shaft 20.

A plurality of light-emitting diodes (LEDs) 60 may be disposed inside the transparent wire 30. As the plurality of LEDs 60 emit light according to the rotation of the transparent wire 30, an image I may be displayed. The transparent wire 30 may be formed of a flexible material.

The shaft actuator 230 may move the shaft 20. The shaft actuator 230 may move the shaft 20 in a direction parallel to the rotation axis. One or more shaft actuators 230 may be provided. For example, a first rotatable shaft actuator 230a may move the first rotatable shaft 20a and a second rotatable shaft actuator 230b may move the second rotatable shaft 20b. A single shaft actuator 230 capable of moving both the first rotatable shaft 20a and the second rotatable shaft 20b may be provided. A radius or an amplitude of the circular path of the circular motion of the transparent wire 30 may be adjusted by movement of the shaft 20 (20a, 20b).

The shaft actuator 230 may have various structures. For example, the shaft actuator 230 may include components such as a slide rail for supporting movement of the shaft 20, a hydraulic cylinder, and/or a step motor. The shaft actuator 230 may be provided separately from the rotating assembly 200 or may be provided integrally with the rotating assembly 200.

In addition, the main body 10 may be provided with a power circuit 110 for receiving power from an external power source and supplying power to electronic components of the display device 1, and a control circuit for controlling the electronic components of the display device 1. Furthermore, a battery capable of storing electrical energy may be provided inside the main body 10.

Figure 3:
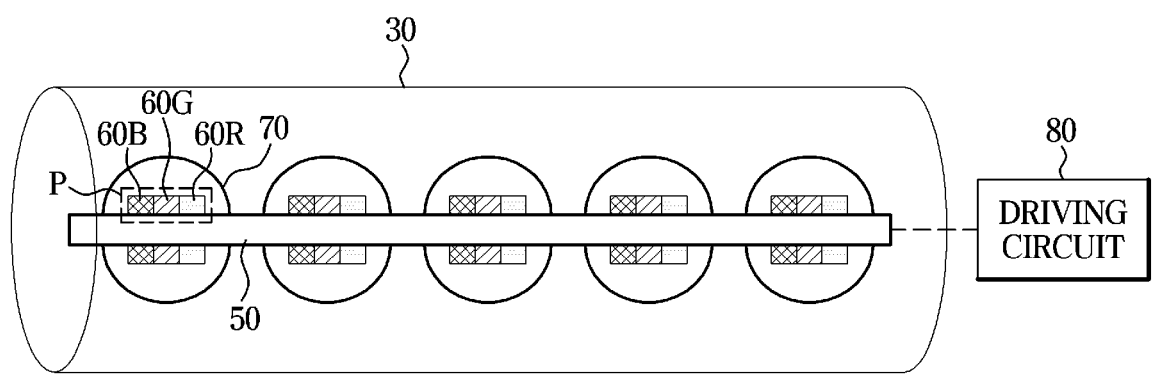
FIG. 3 illustrates an inside of a transparent wire included in the display device according to an embodiment.

FIG. 3 illustrates an inside of a transparent wire included in the display device according to an embodiment.

Referring to FIG. 3, the plurality of LEDs 60 may be provided inside the transparent wire 30. The plurality of LEDs 60 (e.g., red LED 60R, green LED 60G, and blue LED 60B) may be mounted on a substrate 50 provided in a longitudinal direction of the transparent wire 30. The plurality of LEDs 60 may be mounted on at least one of an upper surface and a lower surface of the substrate 50. The plurality of LEDs 60 may be flip-chip LEDs.

Each of the plurality of LEDs 60 may be implemented, for example, as an inorganic material. Inorganic LEDs have a faster reaction speed than Organic LEDs (OLEDs), and may realize high luminance with low power. The OLEDs are vulnerable to exposure to moisture and oxygen and have inferior durability, requiring an encapsulation process. However, the inorganic LEDs do not require an encapsulation process and are more durable. In addition, each of the plurality of LEDs 60 may be, for example, a micro LED having a short side length of 250 μm or less. By using micro-scale LEDs, a pixel size may be reduced and a high resolution may be realized.

According to an embodiment, the display device 1 may be a self-luminous display device in which a light emitting diode is disposed for each pixel P to enable the pixel P to itself emit light. Because the display device 1 does not require components such as a backlight unit, a liquid crystal layer, and a polarizing plate unlike a Liquid Crystal Display (LCD) device, the display device 1 may have a thin thickness and a simple structure, thereby implementing various design changes.

A single pixel P may include a blue LED 60B configured to emit blue light, a green LED 60G configured to emit green light, and a red LED 60R configured to emit red light. Each of the blue LED 60B, the green LED 60G, and the red LED 60R may correspond to a subpixel. Also, a pixel P may include a subpixel configured to emit yellow light and/or white light. The number of pixels may be variously determined depending on a length and a cross-sectional area of the transparent wire 30. A line of the plurality of LEDs 60 may be formed along a longitudinal direction of the transparent wire 30, and one or more lines may be formed.

The plurality of LEDs 60 may emit light according to the rotation of the transparent wire 30. A color and/or intensity of light emitted from each of the plurality of pixels may change while the transparent wire 30 performs a circular motion. That is, the plurality of pixels may emit different light at different rotation angles of the transparent wire 30.

Light emitted from the plurality of LEDs 60 may leave a visual afterimage to a user. An image may be generated by light emitted from different positions according to the rotation of the transparent wire 30. The user may view an image in which afterimages of light continuously emitted from different positions are combined.

The substrate 50 may be a Thin Film Transistor (TFT) substrate. The substrate 50 may include elements such as a switching transistor, a driving transistor, and a capacitor for driving the plurality of LEDs 60. The substrate 50 may be formed of various materials. For example, the substrate 50 may be formed of transparent glass containing $SiO_2$ as a main component, may be formed of transparent plastic to have flexibility, or may be formed of metal.

The substrate 50 may be formed of an insulating organic material selected from a group consisting of polyethersulphone (PES), polyacrylate (PAR), polyetherimide (PEI), polyethyelene napthalate (PEN), and polyethylene terephthalate (PET), polyphenylene sulfide (PPS), polyallylate, polyimide (PI), polycarbonate (PC), cellulose triacetate (TAC), and cellulose acetate propionate (CAP).

The metal contained in the substrate 50 may be selected from a group consisting of iron, chromium, manganese, nickel, titanium, molybdenum, stainless steel (SUS), Invar alloy, Inconel alloy, and Kovar alloy.

In addition, a lens 70 covering the pixel P may be mounted on the substrate 50. Each of the plurality of pixels may be covered by each of a plurality of lenses. The lens 70 may diffuse light emitted from the LEDs 60. The lens 70 may have various shapes. For example, the lens 70 may be provided in a semicircular shape. The lens 70 may be formed of a transparent material.

A driving circuit 80 may drive the plurality of LEDs 60. In other words, the driving circuit 80 may control on and off of the plurality of LEDs 60. The substrate 50 may be electrically connected to the driving circuit 80 and transfer a signal, voltage, and/or current transmitted from the driving circuit 80 to the plurality of LEDs 60. The driving circuit 80 may be provided as a separate chip and may be mounted on the substrate 50.

Figure 4:
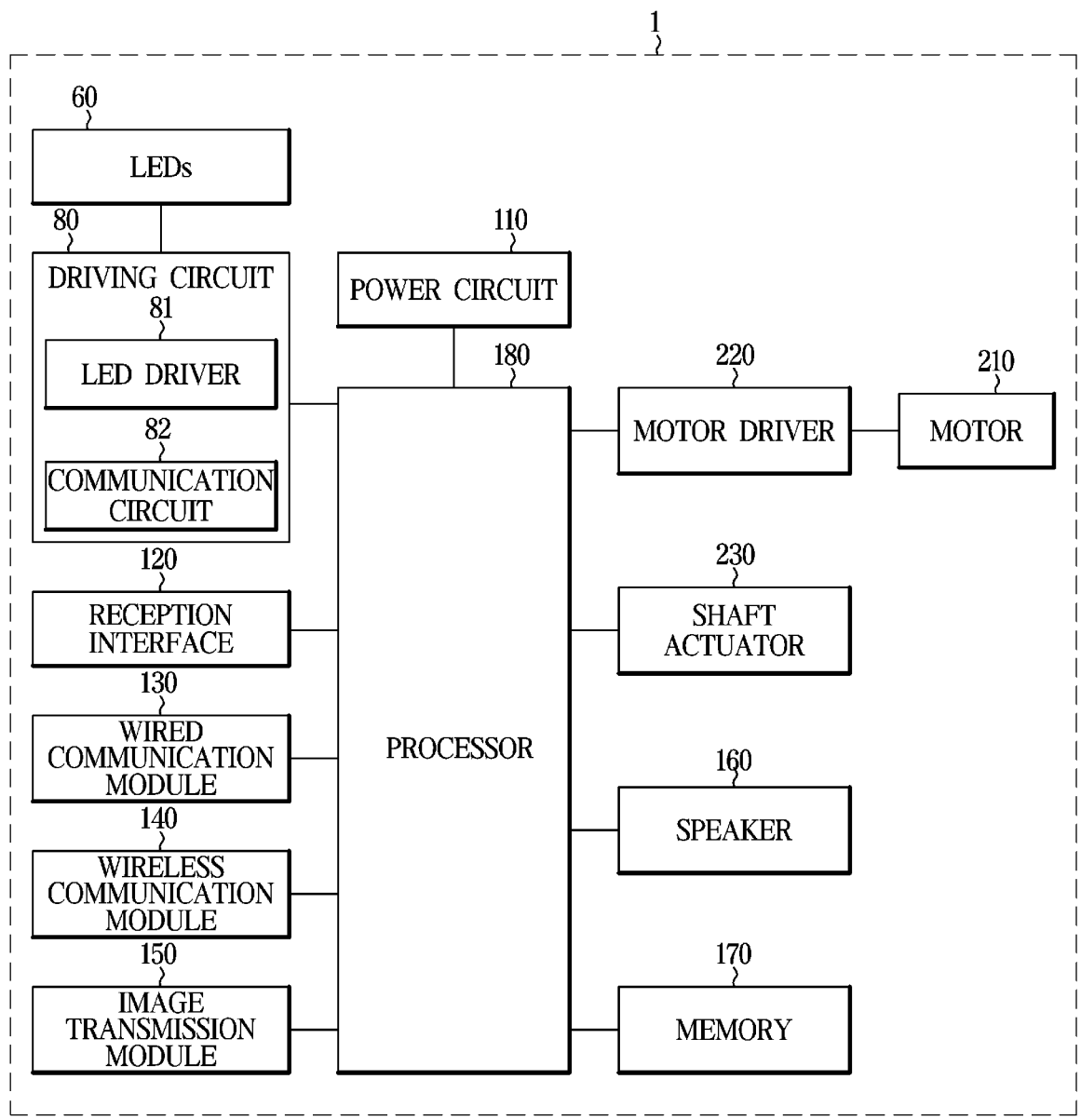
FIG. 4 is a block diagram illustrating a configuration of the display device according to an embodiment.

FIG. 4 is a block diagram illustrating a configuration of the display device according to an embodiment.

Referring to FIG. 4, the display device 1 may include the plurality of LEDs 60, the driving circuit 80, the power circuit 110, a reception interface 120, a wired communication module 130, a wireless communication module 140, an image transmission module 150, a speaker 160, a memory 170, a processor 180, the motor 210, the motor driver 220, and the shaft actuator 230. The processor 180 may be electrically connected to components of the display device 1 and may control an operation of each component. Some the components described in FIG. 4 may be omitted. Also, the display device 1 may further include other components in addition to those described in FIG. 4.

The driving circuit 80 may drive the plurality of LEDs 60. The driving circuit 80 may include an LED driver 81 and a communication circuit 82. The communication circuit 82 may receive an image frame from the processor 180 through wired communication or wireless communication. The LED driver 81 may control on/off of the LEDs 60 based on the image frame transmitted from the processor 180, and adjust an intensity of light emitted from the LEDs 60.

The power circuit 110 may be provided inside the main body 10. The power circuit 110 may receive power from a household power source or a commercial power source, and may supply power to electronic components of the display device 1. For example, the power circuit 110 may supply power to the driving circuit 80 and the plurality of LEDs 60, provided inside the transparent wire 30, by wire or wirelessly, while rotating the transparent wire 30.

The power circuit 110 may include a power reception circuit, a power conversion circuit, and/or a power transmission interface. The power reception circuit may receive alternating current (AC) power from an external AC power source. The power reception circuit may include, for example, an electromagnetic interference (EMI) filter and/or a power factor correction circuit. The power reception circuit may provide AC power to the power conversion circuit. The power conversion circuit may convert AC power to direct current (DC) power, and also convert a voltage of the converted DC power. The power conversion circuit may include, for example, a rectifier circuit and/or a DC-DC converter. The power transmission interface may receive the DC power from the power conversion circuit, and may supply the received DC power to the components of the display device 1.

The reception interface 120 may receive a video signal and an audio signal from content sources. The reception interface 120 may include receiving terminals such as a component (YPbPr/RGB) terminal, a Composite Video Blanking and Sync (CVBS) terminal, an audio terminal, a High Definition Multimedia Interface (HDMI) terminal, and a Universal Serial Bus (USB) terminal. The reception interface 120 may output the received video signal and/or audio signal to the processor 180.

The wired communication module 130 may access a wired network and communicate with external devices corresponding to the content sources through the wired network. For example, the wired communication module 130 may access a local area network and/or a wide area network through Ethernet (IEEE 802.3 standard), and receive data from external devices through the local area network and/or wide area network. The wired communication module 130 may receive content data including video data and/or audio data from a content source and provide the received content data to the processor 180.

The wireless communication module 140 may wirelessly communicate with a base station or Access Point (AP), and may access a local area network and/or a wide area network through the base station or access point. The wireless communication module 140 may also communicate with content sources via the base station or access point. For example, the wireless communication module 140 may wirelessly communicate with the access point using Wi-Fi (IEEE 802.11 standard), or communicate with the base station using Code Division Multiple Access (CDMA), Wideband CDMA (WCDMA), Global System for Mobile Communications (GSM), Long Term Evolution (LTE), or WiBro.

The wireless communication module 140 may directly communicate with external devices, as well as via a base station or an access point. For example, the wireless communication module 140 may wirelessly receive data from external devices using Wi-Fi peer-to-peer, Bluetooth (IEEE 802.15.1 standard), or ZigBee (IEEE 802.15.4 standard).

The wireless communication module 140 may receive content data including video data and/or audio data from a content source, and provide the received content data to the processor 180.

The image transmission module 150 may receive image frame data representing an image frame from the processor 180 and transmit the received image frame data to the driving circuit 80 by wire or wirelessly. The image transmission module 150 may not only transmit the image frame data, but also transmit/receive communication data with the driving circuit 80 by wire or wirelessly. For example, the image transmission module 150 may establish a wireless communication channel between the driving circuit 80 and the image transmission module 150.

The image transmission module 150 may use a wireless communication method providing a sufficient bandwidth to transmit the image frame data. For example, the image transmission module 150 may transmit the image frame data to the driving circuit 80 using the IEEE 802.11ac standard using the 5.8 GHz band.

Although it has been described that the image transmission module 150 is separated from the wireless communication module 140, the image transmission module 150 may be included in the wireless communication module 140.

The speaker 160 may receive an audio signal, which is an electrical signal, from the processor 180, and output a sound corresponding to the audio signal.

The memory 170 may store content data including video and/or audio. Also, the memory 170 may store programs, instructions, applications, and/or data for operating the display device 1. The memory 170 may store programs (a series of instructions) and/or data for the processor 180 to process the content data.

The memory 170 may include a non-volatile memory such as a flash memory, a Solid State Drive (SSD), a Hard Disk Drive (HDD), and an Optical Disc Driver (ODD). The memory 170 may also include a volatile memory such as Static Random Access Memory (S-RAM) or Dynamic Random Access Memory (D-RAM) for temporary data storage.

The motor 210 may be supplied with a driving current from the motor driver 220 and rotate the shaft 20 in response to the driving current supplied from the motor driver 220. For example, the motor 210 may include a permanent magnet forming a magnetic field, and a coil forming a magnetic field in response to a driving current. The motor 210 may rotate a rotating plate connected to the shaft 20 using a magnetic interaction between the magnetic field of the permanent magnet and the coil. In other words, the magnetic interaction between the magnetic field of the permanent magnet and the coil may provide torque to the shaft 20, and the shaft 20 may be rotated by the torque.

The motor driver 220 may receive a target speed command from the processor 180, and provide a driving current corresponding to the received target speed command to the motor 210. The motor driver 220 may control the driving current to be provided to the motor 210 based on a difference between a target speed of the target speed command and a measured speed of the motor 210. For example, the motor driver 220 may receive information about rotation of the motor 210 from a rotation sensor provided in the motor 210.

In addition, the motor driver 220 may obtain a driving current value supplied to the motor 210 and identify a rotational speed of the motor 210 based on the driving current value. For example, the motor driver 220 may increase a driving current in response to the measured speed of the motor 210 being less than the target speed. Also, the motor driver 220 may reduce a driving current in response to the measured speed of the motor 210 being greater than the target speed.

The shaft actuator 230 may move the shaft 20 in a direction parallel to a rotation axis. For example, the first rotatable shaft actuator 230a may move the first rotatable shaft 20a and the second rotatable shaft actuator 230b may move the second rotatable shaft 20b. The shaft actuator 230 may have various structures. For example, the shaft actuator 230 may include components such as a slide rail for supporting a movement of the shaft 20, a hydraulic cylinder for adjusting a movement distance of the shaft 20, and/or a step motor. The shaft actuator 230 may be driven under the control of the processor 180.

The processor 180 may obtain content data from the reception interface 120, the wired communication module 130, the wireless communication module 140, or the memory 170, and may process the obtained content data. The processor 180 may extract video data, image data, and/or audio data from the content data. The processor 180 may decode audio data and obtain an audio signal from the audio data by decoding the audio data. The processor 180 may provide the audio signal to the speaker 160.

The processor 180 may also decode video data and/or image data, and obtain a series of image frames by decoding the video data and/or the image data. The video data may include a series of consecutive image frames, and the series of consecutive image frames may be compressed. The processor 180 may obtain image frame data representing a series of image frames by decoding the video data obtained by compressing the series of image frames.

The processor 180 may transmit the image frame to the driving circuit 80 and control the motor 210 to rotate the transparent wire 30. The image frame may be transmitted to the driving circuit 80 through a wired communication channel or a wireless communication channel. The plurality of image frames may be transmitted consecutively. Also, the processor 180 may divide the image frame into a plurality of image frame parts, and may sequentially provide the plurality of image frame parts to the driving circuit 80 at each predetermined rotation angle of the transparent wire 30. For example, the processor 180 may sequentially provide the plurality of image frame parts to the driving circuit 80 by providing a first image frame part at a first predetermined rotation angle, providing a second image frame part at a second predetermined rotation angle, and so on. As another example, the processor 180 may sequentially provide the plurality of image frame parts to the driving circuit 80 by providing a first image frame part when a predetermined rotation angle passes for a first time, providing a second image frame part when the predetermined rotation angle passes for a second time, and so on. The driving circuit 80 may control the plurality of LEDs 60 based on the image frame while the transparent wire 30 performs a circular motion, and thus an image may be displayed.

The processor 180 may set a display area in which the image is displayed based on a size of the image frame. The display area may be set to correspond to a ratio of a width and a height of the image frame. The processor 180 may also scale the image frame. That is, the size of the image frame may be enlarged or reduced. For example, the processor 180 may reduce the image frame, based on the size of the image frame being greater than a maximum size of a configurable display area. The maximum size of the display area may be determined based on a length of the transparent wire 30.

The processor 180 may adjust a movement distance of at least one of the first rotatable shaft 20a and the second rotatable shaft 20b based on the set display area. Also, the processor 180 may control the shaft actuator 230 based on the movement distance of at least one of the first rotatable shaft 20a and the second rotatable shaft 20b. In other words, the processor 180 may adjust a length at which at least one of the first rotatable shaft 20a and the second rotatable shaft 20b protrudes to the outside of the main body 10.

The processor 180 may adjust a rotational speed of the motor 210 based on adjustment of the movement distance of at least one of the first rotatable shaft 20a and the second rotatable shaft 20b. The processor 180 may also adjust the rotational speed of the motor 210 based on a frame rate of image frames.

Figure 5:
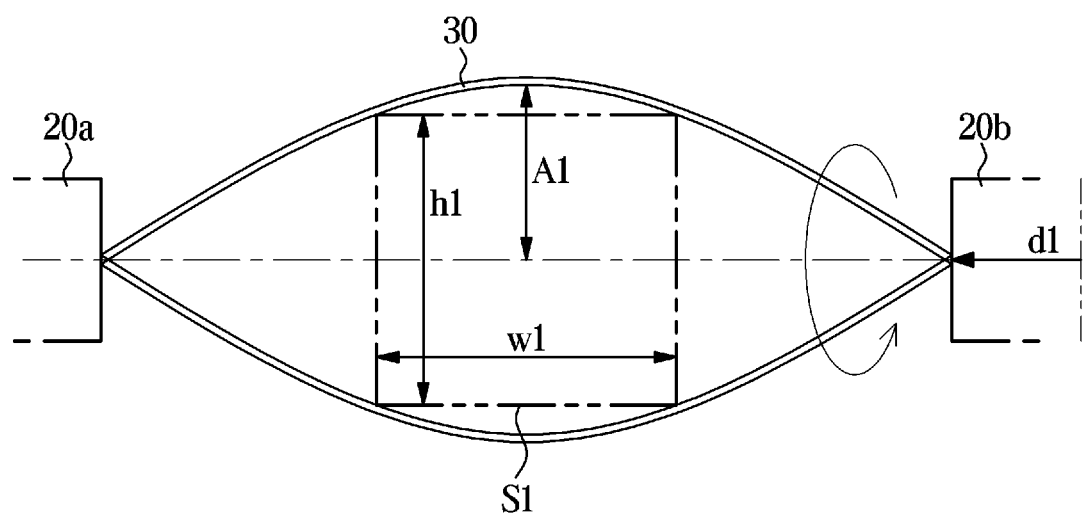
FIG. 5 and FIG. 6 illustrate setting of a display area and an operation of the display device corresponding to the setting according to an embodiment.
Figure 6:
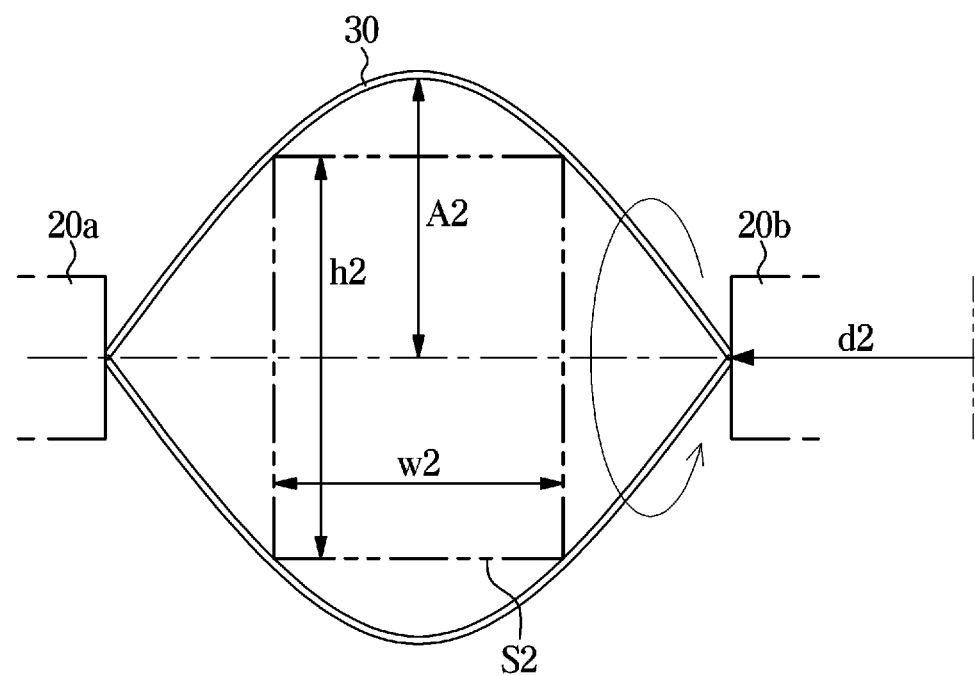

FIG. 5 and FIG. 6 illustrate setting of a display area and an operation of the display device according to the setting.

Referring to FIG. 5 and FIG. 6, the processor 180 may set a display area (S1, S2) in which an image is displayed based on a size of an image frame. The display area (S1, S2) may be set to correspond to a ratio of a width and a height of the image frame.

Referring to FIG. 5, a size of a first image frame obtained from an external content source may have a first width w1 and a first height h1. The first width w1 and the first height h1 may be within a size range of the configurable display area (S1, S2). In this case, the processor 180 may set the first display area S1 having the first width w1 and the first height h1.

The processor 180 may determine a movement distance of at least one of the first rotatable shaft 20a and the second rotatable shaft 20b based on the set display area (S1, S2). It is illustrated in FIG. 5 that the second rotatable shaft 20b is moved to the left by a first movement distance d1 to implement the first display area S1. Due to the movement of the second rotatable shaft 20*b*, a tension of the transparent wire 30 connected between the first rotatable shaft 20*a* and the second rotatable shaft 20*b* may decrease, and the transparent wire 30 may be loosened. In order to implement the first display area S1, the first rotatable shaft 20*a* may move instead of the second rotatable shaft 20*b*, or both the first rotatable shaft 20*a* and the second rotatable shaft 20*b* may move.

In response to rotation of the shaft 20, the transparent wire 30 also rotates, and the transparent wire 30 may perform a circular motion. For example, a central portion of the transparent wire 30 may move along a circular orbit with a first radius R1. While the transparent wire 30 rotates, the plurality of LEDs 60 disposed in the transparent wire 30 may pass through the first display area S1 at regular intervals. The plurality of LEDs 60 may be controlled to emit light corresponding to the first image frame in the first display area S1. Accordingly, an image may be displayed in the first display area S1.

Also, as shown in FIG. 6, the processor 180 may set the second display area S2 having a second width w2 and a second height h2 based on a second image frame different from the first image frame of FIG. 5. The second width w2 may be smaller than the first width w1, and the second height h2 may be greater than the first height h1. In order to implement the second display area S2, the second rotatable shaft 20*b* may be moved to the left by a second movement distance d2. The second movement distance d2 may be greater than the first movement distance d1. Because the second rotatable shaft 20*b* moves more, a tension of the transparent wire 30 may further decrease.

In FIG. 5 and FIG. 6, the transparent wire 30 may have the same length. However, because the second rotatable shaft 20*b* moves more in FIG. 6, a second radius R2 of a circular orbit drawn by the central portion of the transparent wire 30 during rotation is greater than the first radius R1 of the circular orbit drawn by the central portion of the transparent wire 30 in FIG. 5. While the transparent wire 30 rotates, the plurality of LEDs 60 may pass through the second display area S2 at regular intervals. The plurality of LEDs 60 may be controlled to emit light corresponding to the second image frame in the second display area S2. Accordingly, an image may be displayed in the second display area S2.

Meanwhile, in response to a size of image frame being greater than a maximum size of the configurable display area (S1, S2), the processor 180 may reduce the image frame to allow the size of the image frame to be less than the maximum size of the display area (S1, S2). For example, in response to a width and/or a height of an image frame exceeding a width and/or a height of the configurable display area (S1, S2), the size of the image frame may be reduced. Also, in response to a size of an image frame being smaller than a predetermined value, the processor 180 may enlarge the image frame within the maximum size range of the display area (S1, S2).

The processor 180 may control the motor 210 to rotate at least one of the first rotatable shaft 20*a* and the second rotatable shaft 20*b*. The processor 180 may adjust a rotational speed of the motor 210 based on the movement distance (d1, d2) of the shaft 20. In response to a radius of rotation of the transparent wire 30 being changed, a cycle in which the LEDs 60 pass through the same position may vary. For example, in a case where the shaft 20 moves from the position shown in FIG. 5 to the position shown in FIG. 6 without changing the rotational speed of the shaft 20, the radius of the circular orbit along which the central portion of the transparent wire 30 moves increases, and a rotation period also increases. In response to the rotation period of the transparent wire 30 being increased, a speed at which an image is displayed is reduced, and thus the rotational speed of the motor 210 may be increased.

Also, the processor 180 may adjust the rotational speed of the motor 210 based on adjustment of a frame rate of image frames. The frame rate refers to the number of image frames displayed per second. As the frame rate increases, the rotational speed of the motor 210 may also increase. The frame rate may be predetermined according to content or selected by a user.

The processor 180 may adjust the rotational speed of the motor 210 based on the frame rate of image frames. The frame rate refers to the number of image frames displayed per second. For example, in a case where the frame rate is 30, the display device 1 may display 30 image frames per second. In a case where the frame rate is 60, the display device 1 may display 60 image frames per second.

In a case where the frame rate is 30, the processor 180 may control the motor 210 to rotate the transparent wire 7.5 times per second. In other words, the processor 180 may control the motor driver 220 to rotate the transparent wire 30 at 450 Revolution Per Minute (RPM) or more. Also, In a case where the frame rate is 60, the processor 180 may control the motor 210 to rotate the transparent wire 15 times per second. In other words, the processor 180 may control the motor driver 220 to rotate the transparent wire 30 at 900 rpm or more.

Figure 7:
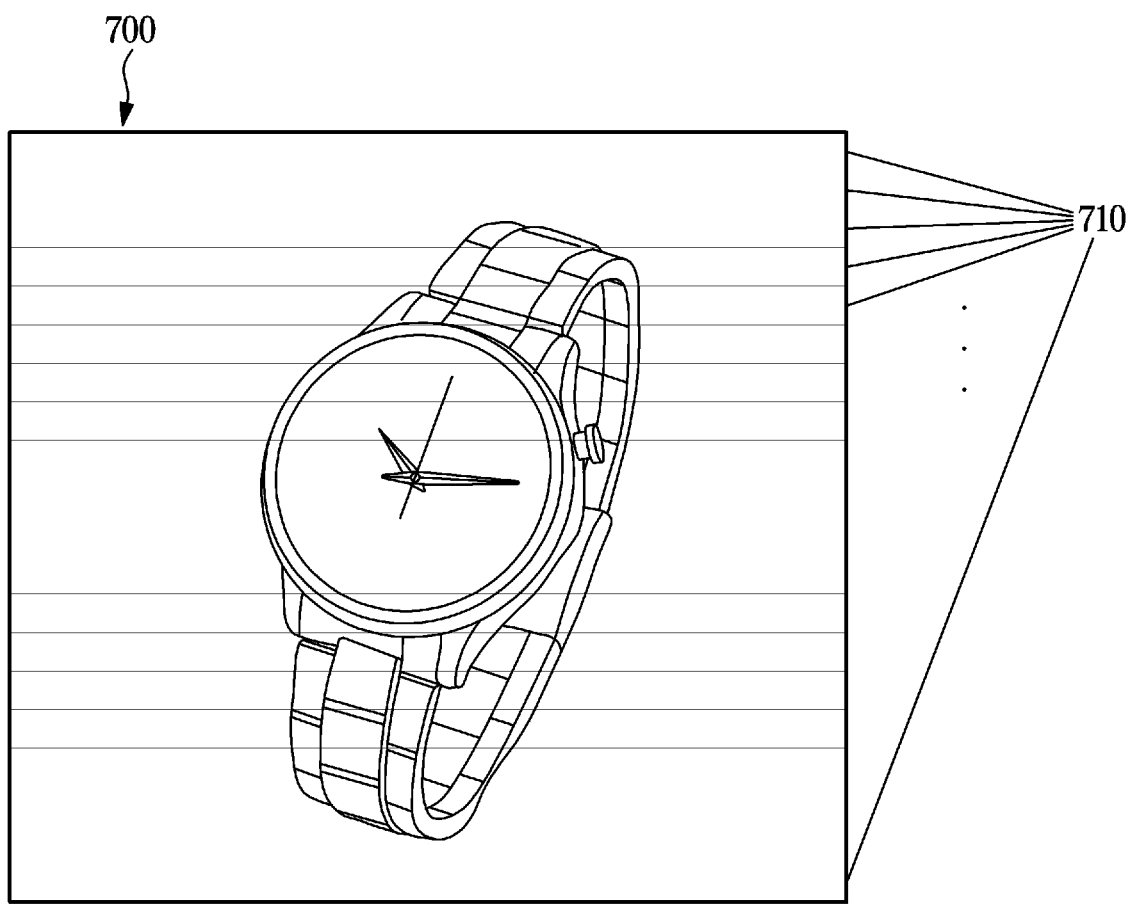
FIG. 7 illustrates processing of image data according to an embodiment.

FIG. 7 illustrates processing of image data.

Referring to FIG. 7, the processor 180 may obtain an image frame 700 by decoding image data. The processor 180 may also divide the image frame 700 into a plurality of image frame parts 710. For example, the processor 180 may obtain 180 image frame parts 710 by dividing the image frame 700 in a vertical direction.

The processor 180 may control the image transmission module 150 to transmit the plurality of image frame parts 710 to the driving circuit 80 in a predetermined order. Also, the processor 180 may generate an image frame stream in which the plurality of image frames are connected, and control the image transmission module 150 to transmit the image frame stream to the driving circuit 80. The image frame stream may include image frame parts for each of the plurality of image frames.

The processor 180 may transmit the plurality of image frame parts 710 to the driving circuit 80 while the transparent wire 30 rotates. The processor 180 may sequentially provide the plurality of image frame parts 710 to the driving circuit 80 at each predetermined rotation angle of the transparent wire 30. For example, the processor 180 may sequentially transmit the image frame parts 710 one by one, each time the transparent wire 30 is rotated by 1 degree. The driving circuit 80 may receive a single image frame part, each time the transparent wire 30 is rotated by 1 degree, and control the plurality of LEDs 60 based on the received image frame part.

The plurality of LEDs 60 may display consecutive image frame parts 710 while the transparent wire 30 rotates. Accordingly, the entire image frame 700 in which the image frame parts 710 are combined may be displayed. A user may see the one entire image frame 700 in which the image frame parts 710 are combined due to an afterimage effect.

The memory 170 may store a program and/or data for the processor 180 to obtain the plurality of image frame parts 710 and sequentially transmit the plurality of image frame parts 710 to the driving circuit 80.

Figure 8:
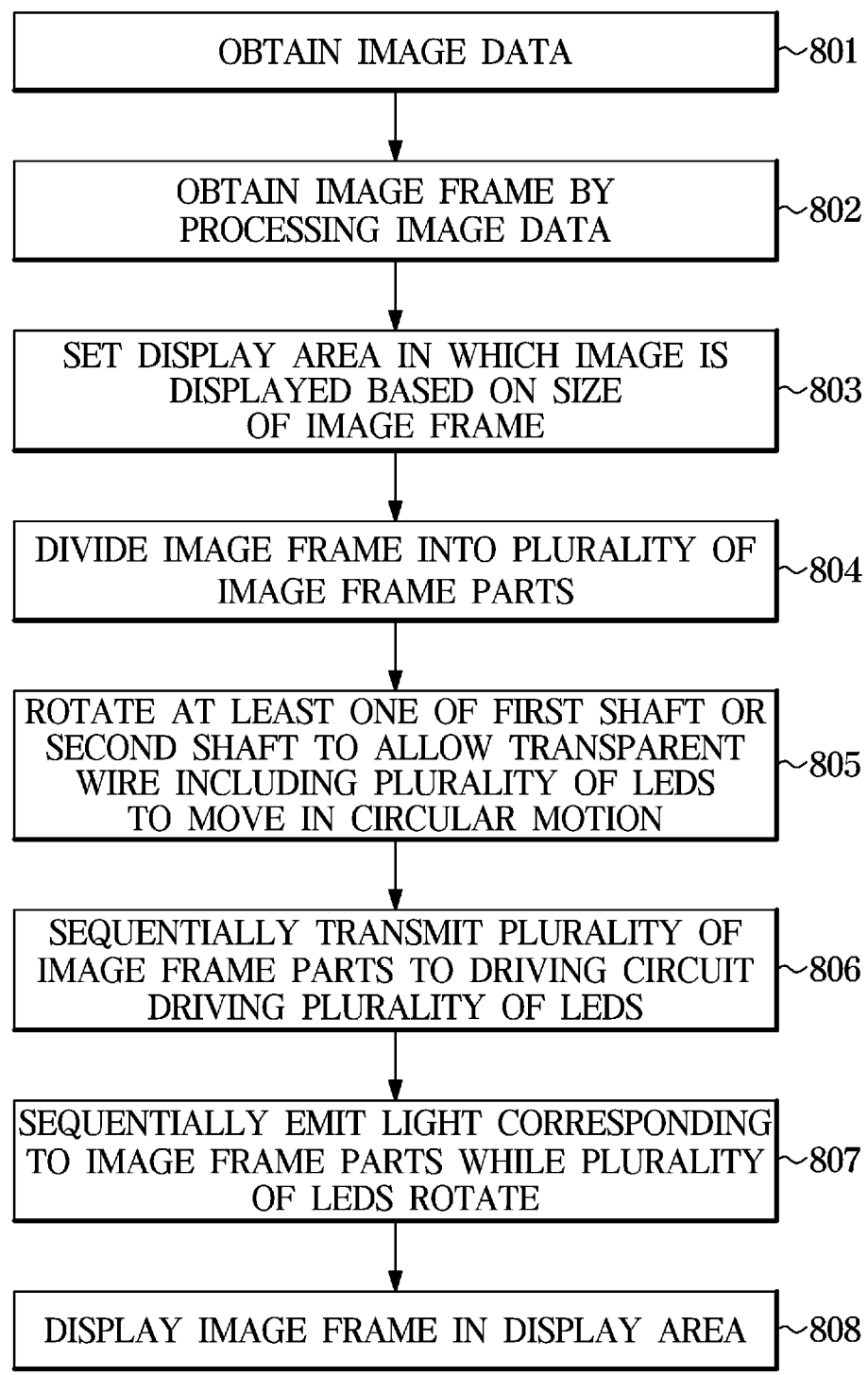
FIG. 8 and FIG. 9 are flowcharts illustrating a control method of a display device according to an embodiment.
Figure 9:
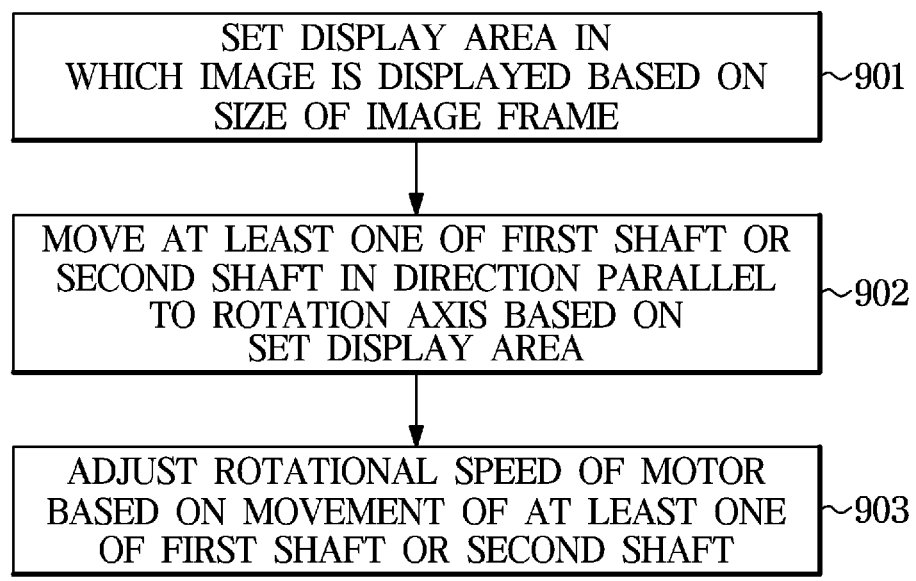

FIG. 8 and FIG. 9 are flowcharts illustrating a control method of a display device according to an embodiment.

Referring to FIG. 8, the display device 1 may obtain image data from an external content source at operation 801. The processor 180 of the display device 1 may obtain an image frame by processing the image data at operation 802. The processor 180 may set a display area in which an image is displayed based on a size of the image frame at operation 803. The processor 180 may divide the image frame into a plurality of image frame parts at operation 804.

The display device 1 may rotate at least one of the first rotatable shaft 20a and the second rotatable shaft 20b to allow the transparent wire 30 including the plurality of LEDs 60 to move in a circular motion at operation 805. Also, the processor 180 may sequentially provide the plurality of image frame parts to the driving circuit 80 in response to the rotation of the transparent wire 30 at operation 806. The driving circuit 80 may control the plurality of LEDs 60 to emit light corresponding to the image frame parts while the transparent wire 30 rotates at operation 807. The plurality of LEDs 60 may display consecutive image frame parts. Accordingly, an entire image in which the image frame parts are combined may be displayed in the display area at operation 808.

Referring to FIG. 9, the processor 180 may set a display area in which an image is displayed based on a size of the image frame at operation 901. In embodiment, operation 901 may be the same as, or may correspond to, the operation 803 as described above with respect to FIG. 8. The processor 180 may control the shaft actuator 230 to move at least one of the first rotatable shaft 20a and the second rotatable shaft 20b in a direction parallel to a rotation axis based on the set display area at operation 903. The processor 180 may also adjust a rotational speed of the motor 210 based on the movement of at least one of the first rotatable shaft 20a and the second rotatable shaft 20b at operation 903.

The disclosed display device and the control method thereof may display an image by performing a circular motion on a transparent wire including an LED. The disclosed display device and the control method thereof may provide a new visual experience to a user by outputting a new type of image with a new form factor different from existing display devices.

Meanwhile, the disclosed embodiments may be embodied in the form of recording medium storing instructions executable by a computer. The instructions may be stored in the form of program code and, when executed by a processor, may generate a program module to perform the operations of the disclosed embodiments. The recording medium may be implemented as a computer-readable recording medium.

The computer-readable recording medium may include all kinds of recording media storing instructions that can be interpreted by a computer. For example, the computer-readable recording medium may be read only memory (ROM), random access memory (RAM), a magnetic tape, a magnetic disc, a flash memory, an optical data storage device, etc.

The machine-readable storage medium may be provided in the form of a non-transitory storage medium. The term "non-transitory storage medium" may mean a tangible device without including a signal, e.g., electromagnetic waves, and may not distinguish between storing data in the storage medium semi-permanently and temporarily. For example, the non-transitory storage medium may include a buffer that temporarily stores data.

The aforementioned methods according to the various embodiments of the disclosure may be provided in a computer program product. The computer program product may be a commercial product that may be traded between a seller and a buyer. The computer program product may be distributed in the form of a machine-readable storage medium (e.g., a compact disc read only memory (CD-ROM)), through an application store (e.g., Play Store™), directly between two user devices (e.g., smart phones), or online (e.g., downloaded or uploaded). When distributed online, at least a portion of the computer program product (e.g., a downloadable application) may be temporarily generated or at least temporarily stored in the machine-readable storage medium, such as a memory of the manufacturer's server, an application store server, or a relay server.

Although example embodiments of the disclosure have been described with reference to the accompanying drawings, a person having ordinary skilled in the art will appreciate that other specific modifications may be included in the disclosure without departing from the technical spirit of the disclosure. Therefore, the foregoing embodiments should be regarded as illustrative rather than limiting in all aspects.

What is claimed is:

1. A display device, comprising:
   a main body;
   a first rotatable shaft included in a first portion of the main body;
   a second rotatable shaft included in a second portion of the main body, the second portion being opposite to the first portion;
   a motor disposed inside the main body, and connected to at least one of the first rotatable shaft and the second rotatable shaft;
   a transparent wire including a first end connected to the first rotatable shaft and a second end connected to the second rotatable shaft;
   a plurality of light emitting diodes (LEDs) included inside the transparent wire in a longitudinal direction of the transparent wire;
   a driving circuit configured to drive the plurality of LEDs; and
   a processor configured to control the motor to rotate the transparent wire, and to provide an image frame to the driving circuit to display an image by rotation of the transparent wire.

2. The display device of claim 1, further comprising:
   a substrate included in the transparent wire in the longitudinal direction of the transparent wire,
   wherein the plurality of LEDs are mounted on at least one of an upper surface of the substrate and a lower surface of the substrate.

3. The display device of claim 2, further comprising:
   a plurality of lenses mounted on the substrate to cover each of a plurality of pixels formed by the plurality of LEDs,
   wherein the plurality of lenses are configured to diffuse light emitted from the plurality of LEDs.

4. The display device of claim 1, further comprising:
   a shaft actuator disposed in the main body,
   wherein the shaft actuator is configured to move at least one of the first rotatable shaft and the second rotatable shaft in a direction parallel to a rotation axis.

5. The display device of claim 4, wherein the processor is further configured to:
   set a display area in which the image is displayed based on a size of the image frame;

adjust a movement distance of the at least one of the first rotatable shaft and the second rotatable shaft based on the display area to produce an adjusted movement distance; and control the shaft actuator based on the adjusted movement distance.

6. The display device of claim 5, wherein the processor is configured to adjust a rotational speed of the motor based on the adjusted movement distance of the at least one of the first rotatable shaft and the second rotatable shaft.

7. The display device of claim 5, wherein the processor is configured to set the display area corresponding to a ratio of a width of the image frame and a height of the image frame.

8. The display device of claim 5, wherein the processor is further configured to, based on a size of the image frame being greater than a maximum size of a configurable display area, scale the image frame.

9. The display device of claim 1, wherein the processor is further configured to:

obtain the image frame by decoding image data, divide the image frame into a plurality of image frame parts, and sequentially provide the plurality of image frame parts to the driving circuit at each predetermined rotation angle of the transparent wire.

10. The display device of claim 1, wherein the processor is further configured to adjust a rotational speed of the motor based on adjustment of a frame rate.

11. The display device of claim 1, further comprising:

a wireless communication module configured to establish a wireless communication channel with the driving circuit, wherein the processor is further configured to transmit the image frame using the wireless communication module through the wireless communication channel.

12. A control method of a display device, the control method comprising:

providing an image frame to a driving circuit configured to drive a plurality of light emitting diodes (LEDs);

rotating at least one of a first rotatable shaft and a second rotatable shaft connected to a transparent wire including the plurality of LEDs to move the transparent wire in a circular motion; and displaying an image by driving the plurality of LEDs simultaneously with the circular motion of the transparent wire.

13. The control method of claim 12, wherein the providing of the image frame comprises:

dividing the image frame into a plurality of image frame parts; and sequentially providing the plurality of image frame parts to the driving circuit at a plurality of predetermined rotation angles of the transparent wire.

14. The control method of claim 12, wherein the providing of the image frame comprises setting a display area for displaying the image based on a size of the image frame.

15. The control method of claim 14, wherein the rotating of the at least one of the first rotatable shaft and the second rotatable shaft comprises moving the at least one of the first rotatable shaft and the second rotatable shaft in a direction parallel to a rotation axis based on the display area.

* * * * *